United States Patent [19]
Yahisa et al.

[11] Patent Number: 5,906,884
[45] Date of Patent: *May 25, 1999

[54] MAGNETIC RECORDING MEDIUM

[75] Inventors: Yotsuo Yahisa; Yoshibumi Matsuda, both of Odawara; Joe Inagaki, Tokyo; Enji Fujita, Odawara; Takao Yonekawa, Odawara; Mitsuhiro Shoda, Odawara; Akira Kato, Odawara; Yuzuru Hosoe, Hino; Masukazu Igarashi, Kawagoe, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/518,391

[22] Filed: Aug. 15, 1995

[30] Foreign Application Priority Data

Aug. 19, 1994 [JP] Japan ..................... 6-195479

[51] Int. Cl.$^6$ ........................................ G11B 5/82
[52] U.S. Cl. ................ 428/212; 428/65.3; 428/694 T; 428/694 TS; 428/694 ST; 428/900
[58] Field of Search ................. 428/694 T, 694 TS, 428/694 ST, 65.3, 900, 212

[56] References Cited

U.S. PATENT DOCUMENTS

| | | | |
|---|---|---|---|
| 3,625,849 | 12/1971 | Rogalla | 204/192 |
| 4,438,066 | 3/1984 | Aboaf et al. | 420/435 |
| 4,680,211 | 7/1987 | Evans et al. | 428/65 |
| 4,780,671 | 10/1988 | Hase et al. | 324/209 |
| 4,985,306 | 1/1991 | Morizane et al. | 428/410 |
| 5,374,462 | 12/1994 | Funaki et al. | 428/694 SG |
| 5,401,572 | 3/1995 | Uchiyama et al. | 428/336 |
| 5,431,804 | 7/1995 | Caballero | 204/129 |

FOREIGN PATENT DOCUMENTS 49-122707  11/1974  Japan .

*Primary Examiner*—Stevan A. Resan
*Attorney, Agent, or Firm*—Fay,Sharep,Beall,Fagan,Minnich & McKee

[57] ABSTRACT

A magnetic recording medium has a substrate made of a nonmetal nonmagnetic material whose coefficient of linear expansion lies within a range from 0.000013/deg to 0.0001/deg. A magnetic layer is formed on the substrate as a thin polycrystalline film or a thin amorphous film. The magnetic layer has Co as a main component, which exhibits a negative magnetostrictive constant so that its coercive force rises in the direction of compressive strain. The magnetic layer is subjected to an in-plane compressive strain from the substrate due to a difference between the coefficient of thermal expansion of the substrate and the magnetic layer so that high coercivity is obtained in the magnetic layer.

3 Claims, 4 Drawing Sheets

FIG. 5

| | COERCIVE FORCE (Oe) | APPARATUS S/N RATIO (dB) | ERROR AFTER SHOCK |
|---|---|---|---|
| EMBODIMENT 1 | 2550 | 35 | NONE |
| EMBODIMENT 2 | 2430 | 33 | NONE |
| EMBODIMENT 3 | 2510 | 34 | NONE |
| COMPARISON 1 | 2230 | 21 | NONE |
| COMPARISON 2 | 1890 | 19 | NONE |
| COMPARISON 3 | 1800 | 18 | NONE |
| COMPARISON 4 | 2660 | 32 | OCCURENCE |

MAGNETIC RECORDING MEDIUM

BACKGROUND OF THE INVENTION

The invention relates to a magnetic recording medium which is used in a magnetic memory apparatus such as rigid type magnetic disk apparatus, drum type memory apparatus, card type magnetic memory apparatus, or the like and, more particularly, to a magnetic recording medium having a high shock resistance and a high coercive force.

In recent years, in association with an increase in information amount, not only a large capacity is more and more being required in a magnetic memory apparatus but also the desire for miniaturization is increasing. In many cases, since the miniaturized magnetic memory apparatus is installed in a portable computer or the like, it is necessary to have a high shock resistance such that the magnetic memory apparatus is not broken by mechanical shock caused by dropping it or the like. To accomplish such a requirement, for example, according to JP-A-49-122707, there has been proposed a method or the like whereby in place of an Al alloy substrate plated with NiP, a nonmetal nonmagnetic substrate having a higher yield strength such as tempered glass, crystallized glass, ceramics, amorphous carbon, monocrystalline silicon, surface oxidized monocrystalline silicon, or the like is used as a substrate of the magnetic recording medium.

SUMMARY OF THE INVENTION

It is an object of the invention to provide a magnetic recording medium in which a reproduction output is high and a high density recording can be performed by increasing a coercive force of the medium.

Another object of the invention is to provide a magnetic recording medium which can perform high density recording while maintaining high shock resistance.

However, when a substrate such as tempered glass, crystallized glass, ceramics, amorphous carbon, monocrystalline silicon, surface oxidized monocrystalline silicon, or the like is used in the above conventional technique, it has been found that there is a problem such that as compared with the case of using the NiP plated Al alloy substrate, the coercive force of the magnetic recording medium is likely to decrease. Namely, according to the research of the present inventors et al., a coefficient of linear expansion at an ordinary temperature of the substrate made of tempered glass, crystallized glass, ceramics, amorphous carbon, monocrystalline silicon, surface oxidized monocrystalline silicon, or the like is equal to, for example, about 0.000009/deg in case of the tempered glass substrate N5A made by HOYA Corporation and about 0.000012/deg in case of the crystallized glass substrate MemCor 2 made by Corning Incorporated, both of which are remarkably smaller than the coefficient of linear expansion of about 0.000023/deg at an ordinary temperature of the NiP plated Al alloy substrate and both of which are very close to or smaller than, for example, about 0.000012/deg as a coefficient of linear expansion at an ordinary temperature of a magnetic layer. It has been found, therefore, that an in-plane compressive strain which is applied from the substrate to the magnetic layer which is directly provided on the substrate or which is provided through an underlayer is small or an in-plane tensile strain is applied, so that a coercive force of the magnetic recording medium is likely to decrease.

The invention intends to solve the problems of the conventional technique mentioned above and to provide a magnetic recording medium in which by applying a large in-plane compressive strain to a magnetic layer, a reproduction output is raised by increasing the coercive force of the magnetic recording medium and a high density recording is achieved while keeping a high shock resistance.

To accomplish the above object, according to the invention, in a magnetic recording medium having a magnetic layer of at least one layer on a nonmetal nonmagnetic substrate, wherein the magnetic layer comprises a thin polycrystaline film or a thin amorphous film, a coefficient of linear expansion at an ordinary temperature of the nonmetal nonmagnetic substrate is set to a value within a range from 0.000013/deg or more to 0.0001/deg or less.

According to the invention, a coefficient of linear expansion at an ordinary temperature of the non-metal nonmagnetic substrate is set to be larger than a coefficient of linear expansion at an ordinary temperature of the magnetic layer.

As a magnetic layer, a layer having a negative magnetostrictive constant is used. A coefficient of linear expansion of the magnetic layer is set to, for example, 0.000012/deg or lower than the coefficient of linear expansion of the non-metal nonmagnetic substrate.

As a magnetic head which is combined with such a magnetic recording medium, by using a magnetic head which includes at least a metal magnetic alloy or magnetoresistive effect device in a part of a magnetic core (slider) and in which zirconia or alumina titanium carbide or ferrite is substantially used as a main component of the magnetic core, a large capacity magnetic memory apparatus in which a memory capacity is 1.5 or more times as large as that of the conventional memory apparatus and a reliability is high can be manufactured. By providing a coating layer made of C, Si, $SiO_2$, $ZrO_2$, or $Al_2O_3$ onto the surface of the magnetic head which faces the magnetic recording medium, the reliability of the magnetic memory apparatus can be remarkably improved. Therefore, such a structure is more preferable.

The operation based on the above construction will now be described.

The invention provides a magnetic recording medium in which by using a nonmetal nonmagnetic substrate of a large coefficient of linear expansion, a coercive force of the magnetic recording medium is increased and an output is raised while keeping a high shock resistance, thereby enabling a high density recording to be performed. Such a medium can be accomplished by the following operation.

Generally, an alloy magnetic material using Co as a main component which is frequently used as a magnetic layer has a negative magnetostrictive constant and such a fact shows a nature in which the coercive force rises in the direction of a compressive strain. In the magnetic recording medium, on the other hand, when the magnetic layer which is directly provided or is provided through the underlayer onto the substrate in a range from about 150° C. to 300° C. is cooled to room temperature, the magnetic layer is subjected to an in-plane compressive stress or an in-plane tensile stress from the substrate due to a difference between the coefficients of thermal expansion of the substrate and the magnetic layer, so that a strain occurs. Therefore, in order to obtain a high coercive force, it is effective that the magnetic layer is subjected to a large in-plane compressive stress from the substrate. FIG. 3 is a diagram showing the relations between the coefficients of linear expansion of the substrates at an ordinary temperature of embodiments 1 and 2 of the invention and comparison examples 1 to 4 and their coercive forces in the in-plane circumferential direction. As will be obviously understood from this graph, the magnetic recording medium using the substrate of a large coefficient of linear expansion shows a high coercive force.

A preferable range of the coefficient of linear expansion of the nonmetal nonmagnetic substrate will now be described. In order to allow the magnetic layer to be subjected to the large in-plane compressive stress from the substrate at an ordinary temperature, it is necessary that a coefficient of thermal expansion is larger than a coefficient of thermal expansion of the magnetic layer. Since the coefficient of linear expansion at an ordinary temperature of the alloy magnetic material including Co as a main component is equal to about 0.000012/deg, it is desirable to set the coefficient of linear expansion at an ordinary temperature of the nonmetal nonmagnetic substrate to 0.000013/deg or more because the magnetic layer is subjected to the large in-plane compressive strain as mentioned above. When the coefficient of linear expansion is less than 0.000013/deg, since the in-plane compressive stress which is applied to the magnetic layer from the substrate decreases or the in-plane tensile strain is applied and the coercive force is likely to decrease, it is undesirable. On the contrary, when the coefficient of linear expansion at an ordinary temperature is larger than 0.0001/deg, since it is too much larger than the coefficient of linear expansion of the magnetic layer, an excessive strain is applied to the magnetic layer and an adhesion between the substrate and the magnetic layer is deteriorated, so that it is also undesirable. It is, consequently, preferable to set the coefficient of linear expansion at an ordinary temperature of the nonmetal nonmagnetic substrate to a value within a range from 0.000013/deg or more to 0.0001/deg or less in order to obtain a high coercive force and a good adhesive performance between the substrate and the magnetic layer.

There are various glasses as a nonmetal nonmagnetic substrate having such a coefficient of linear expansion. By using such a glass, both a high shock resistance and a high coercive force can be obtained.

As a magnetic head which is combined with the magnetic recording medium of the invention, by using a magnetic head in which at least a metal magnetic alloy or a magneto-resistive effect device is included in a part of the magnetic core (slider) and zirconia or alumina titanium carbide or ferrite is substantially used as a main component, a magnetic memory apparatus of a high reliability and a large capacity can be manufactured, so that it is preferable. This is because each of zirconia, alumina titanium carbide, and ferrite has a thermal conductivity of 0.005 cal/sec/cm/deg or more and a thermal strain is small and a thermal volatilization of the lubricating agent hardly occurs, so that a slide resistance performance is improved. Further, when a coating layer made of C, Si, $SiO_2$, $ZrO_2$, or $Al_2O_3$ is formed on the surface of the magnetic head which faces the magnetic recording medium, the reliability of the magnetic memory apparatus can be remarkably improved, so that it is more preferable. This is because a coefficient of friction when the magnetic head comes into contact with the magnetic recording medium can be reduced. Such a magnetic head is preferable because since it has a low frictional coefficient, there is no fear such that during the operation, the temperature of the magnetic recording medium will be raised due to a frictional heat and the in-plane compressive strain deteriorated so that its coercive force is reduced.

As described in detail above, according to the invention, by using the nonmetal nonmagnetic substrate of a coefficient of linear expansion larger than that of a magnetic layer, there is an effect such that a magnetic recording medium in which a coercive force of the recording medium is increased and a reproduction output is raised while keeping a high shock resistance and which can perform a high density recording is obtained.

As a nonmetal nonmagnetic substrate, by using a substrate whose coefficient of linear expansion at an ordinary temperature lies within a range from 0.000013/deg to 0.0001/deg, there is an effect such that a magnetic recording medium having a high coercive force and a high shock resistance in combination with the magnetic layer whose coefficient of linear expansion of the Co system is equal to or less than about 0.000012/deg is obtained.

BRIEF DESCRIPTION OF THE DRAWINGS

FIG. 5 is a diagram showing various characteristics of embodiments and comparison examples.

DESCRIPTION OF THE PREFERRED EMBODIMENTS

An embodiment of the invention will now be described hereinbelow with reference to the drawings.

Embodiment 1

Figure 1:
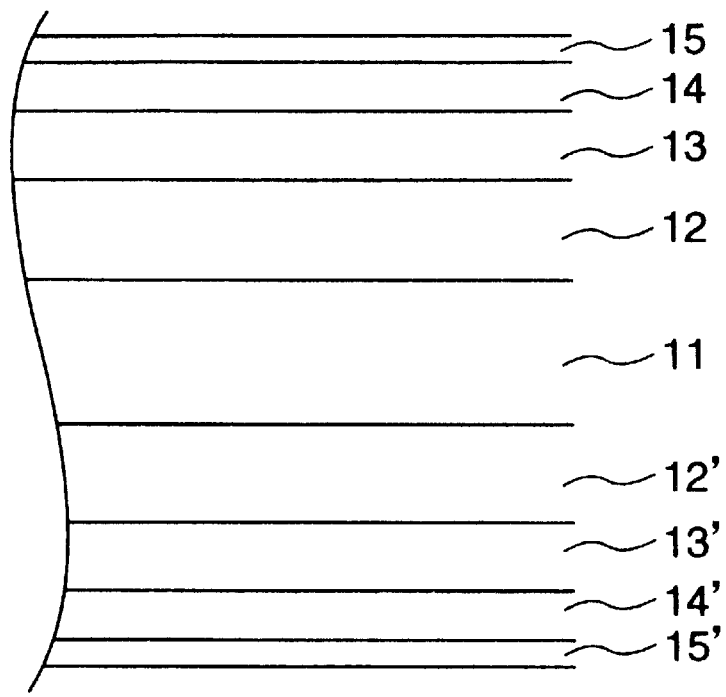
FIG. 1 is a cross sectional view of a magnetic recording medium in an embodiment 1 of the invention.

FIG. 1 is a cross sectional view of a magnetic recording medium of an embodiment 1 of the invention.

A glass substrate 11 having a center line mean surface roughness of 1 nm, a diameter of 48 mmφ, and a thickness of 1.0 mm was formed by using, for example, a glass plate material ML-01 having a coefficient of linear expansion of 0.000018/deg at an ordinary temperature made by Nippon Denki Glass Co. Ltd. Subsequently, Cr underlayers 12 and 12' each having a film thickness of 30 nm and $Co_{0.78}Cr_{0.16}Ta_{0.06}$ magnetic layers 13 and 13' each having a film thickness 30 nm were formed on the glass substrate 11 at a substrate temperature of 250° C. and at an argon gas pressure of 5 mTorr and at a power of 10 W/cm² by a DC magnetron sputtering method. After that, carbon protective coating layers 14 and 14' each having a film thickness of 10 nm were formed at a substrate temperature of 140° C. and at an argon gas pressure of 10 mTorr and at a power of 1 W/cm² by a DC magnetron sputtering method. Further, perfluoro alkyl polyether lubricating layers 15 and 15' each having a film thickness of 4 nm and an adsorbing polar group including a benzene ring were formed at the ends. Thus, a disk-shaped magnetic recording medium was formed.

Embodiment 2

Another embodiment of the magnetic recording medium of the structure shown in FIG. 1 will now be described.

A glass substrate having a center line mean surface roughness of 1 nm, a diameter of 48 mmφ, and a thickness of 1.5 mm was formed by using, for example, a glass plate material A-3 having a coefficient of linear expansion of 0.000016/deg at an ordinary temperature made by Nippon Denki Glass Co. Ltd. A magnetic recording medium was formed by substantially the same method as that of the embodiment 1.

Embodiment 3

Figure 2:
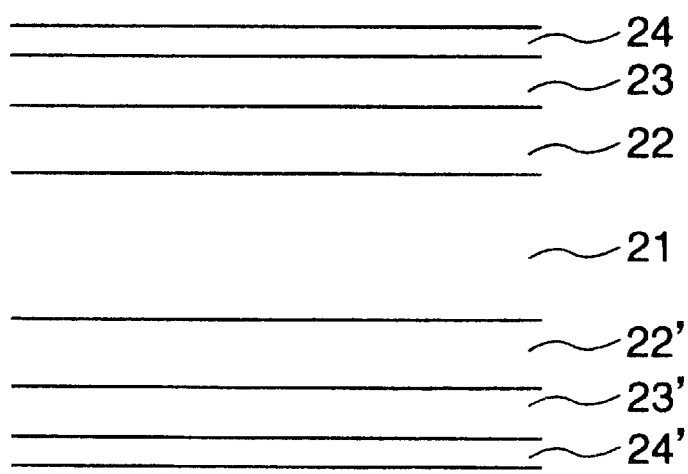
FIG. 2 is a cross sectional view of the magnetic recording medium in an embodiment 3 of the invention.

FIG. 2 is a cross sectional view of a magnetic recording medium of an embodiment 3 of the invention.

A glass substrate 21 having a center line mean surface roughness of 1 nm, a diameter of 48 mmφ, and a thickness of 0.635 mm was formed by using, for example, a glass plate material ML-01 having a coefficient of linear expansion of 0.000018/deg at an ordinary temperature made by Nippon Denki Glass Co. Ltd. Subsequently, $Co_{0.76}Cr_{0.16}Pt_{0.08}$ magnetic layers 22 and 22' each having a film thickness of 25 nm were formed on the glass substrate 21 at a substrate temperature of 250° C. and an argon gas pressure of 3 mTorr and at a power of 10 W/cm$^2$ by a DC magnetron sputtering method. After that, carbon protective coating layers 23 and 23' each having a film thickness of 10 nm were formed at a substrate temperature of 100° C. and at a pressure of 10 mTorr of a mixture gas containing argon of 85 vol % and methane of 15 vol % and with at a power of 1 W/cm$^2$ by a DC magnetron sputtering method. Further, perfluoro alkyl polyether lubricating layers 24 and 24' each having a film thickness of 4 nm and an adsorbing polar group including CN were formed at the ends. Thus, a magnetic recording medium was formed.

Comparison example 1

A comparison example 1 of the magnetic recording medium of the structure shown in FIG. 1 will now be described.

A magnetic recording medium was formed by substantially the same method as that of the embodiment 1 by using a crystallized glass substrate of MemCor 2 having a center line mean surface roughness of 3 nm, a diameter of 65 mmφ, a thickness of 0.8 mm, and a coefficient of linear expansion of 0.000012/deg at an ordinary temperature made by Corning Incorporated.

Comparison example 2

Another comparison example of the magnetic recording medium of the structure shown in FIG. 1 will now be described.

A magnetic recording medium was formed by substantially the same method as that of the embodiment 1 by using a tempered glass substrate N5A having a center line mean surface roughness of 1 nm, a diameter of 48 mmφ, a thickness of 0.635 mm, and a coefficient of linear expansion of 0.000009/deg made by HOYA Corporation.

Comparison 3

Further another comparison example of the magnetic recording medium of the structure shown in FIG. 1 will now be described.

A magnetic recording medium was formed by substantially the same method as that of the embodiment 1 by using an amorphous carbon substrate UDAC having a center line mean surface roughness of 1 nm, a diameter of 48 mmφ, a thickness of 0.635 mm, and a coefficient of linear expansion of 0.000003/deg at an ordinary temperature made by Kobe Steel Ltd.

Comparison 4

Further another comparison example of the magnetic recording medium of the structure shown in FIG. 1 will now be described.

A magnetic recording medium was formed by substantially the same method as that of the embodiment 1 by using an NiP plated Al alloy substrate having a center line mean surface roughness of 1 nm, a diameter of 65 mmφ, a thickness of 0.8 mm, and a coefficient of linear expansion at an ordinary temperature of 0.000023/deg.

Embodiment 4

Coercive forces in the in-plane circumferential direction of the magnetic recording media of the embodiments 1 to 3 and comparison examples 1 to 4 were measured by a vibration sampling type magnetometer.

Figure 3:
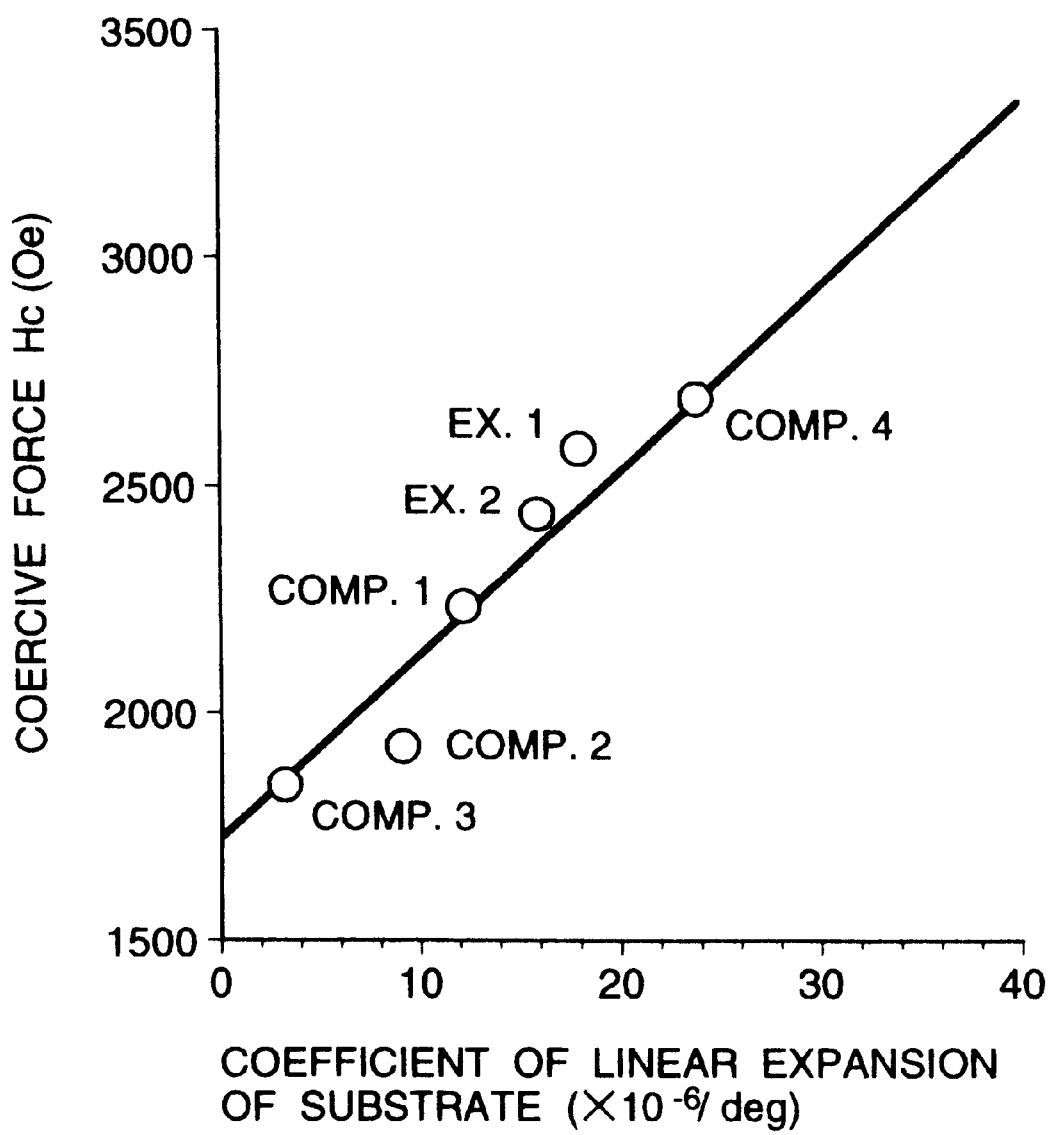
FIG. 3 is a diagram showing the relations between the coefficients of linear expansion of substrates and the coercive forces of magnetic recording media.

FIG. 3 is a diagram showing the relations between the coefficients of linear expansions of the substrates at an ordinary temperature and the coercive forces in the in-plane circumferential direction of the magnetic recording media. In FIG. 3, "Ex. 1" and "Ex. 2" denote the embodiments 1 and 2 and "Comp. 1" to "Comp. 4" show the above comparison examples 1 to 4. According to the comparison example 4, the coefficient of linear expansion of the substrate satisfies the conditions of the present invention and even when the coercive force is large, since the NiP plated AQ alloy substrate is used, a surface hardness is low and a deformation occurs and an error occurred as will be explained hereinlater.

Figure 4:
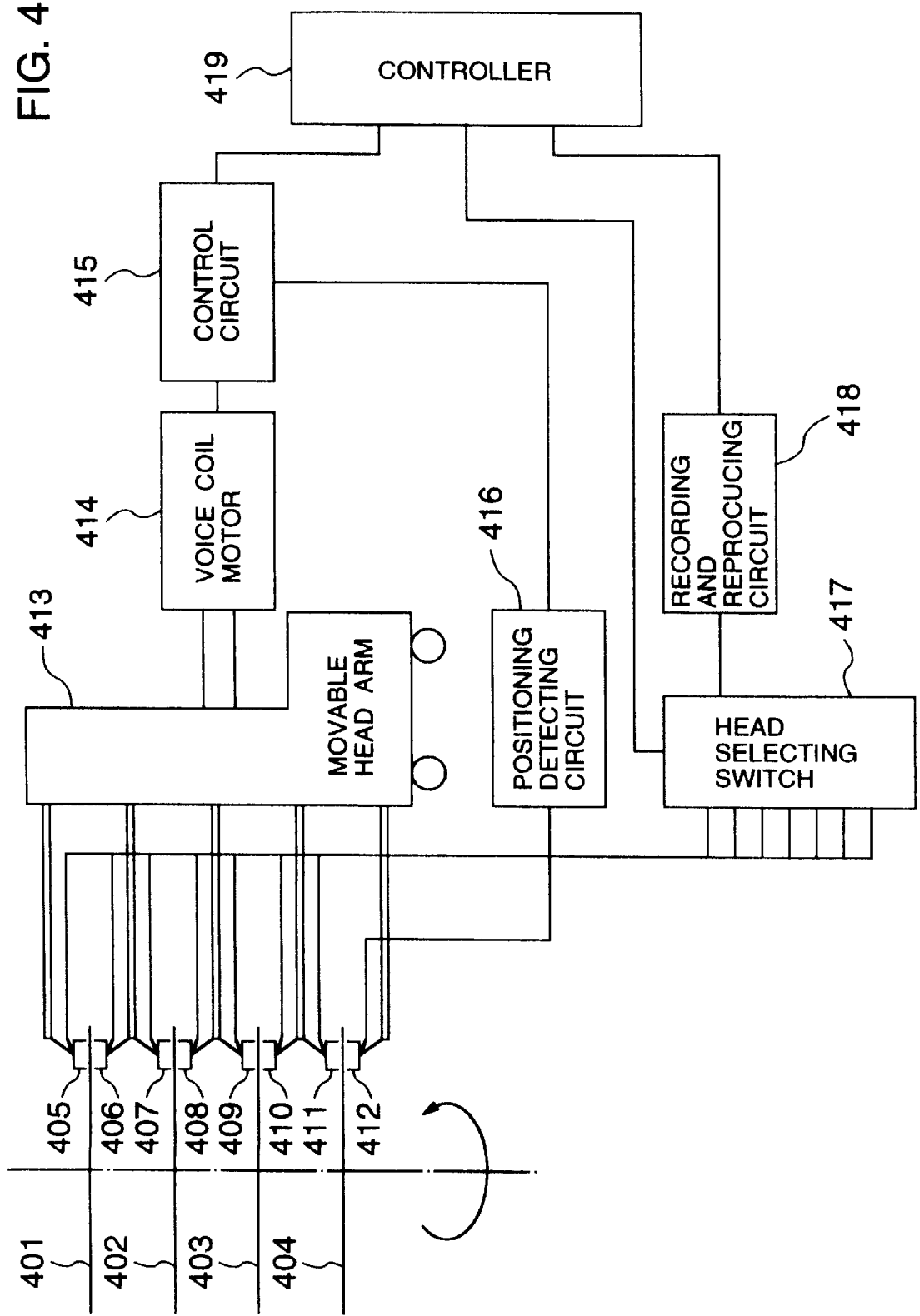
FIG. 4 is a constructional diagram of a magnetic memory apparatus in an embodiment 4 of the invention.

Further, one, two, four, and eight magnetic recording media of the embodiments 1 to 3 and comparison examples 1 to 4 were used and a thin film magnetic head in which at least an NiFe alloy is included in a part of the magnetic core and a nonmagnetic material using zirconia as a main component is used as a core portion was combined, thereby forming the magnetic memory apparatus shown in FIG. 4. Recording and reproducing characteristics of such a magnetic memory apparatus were evaluated. In FIG. 4, reference numerals 401, 402, 403, and 404 denote magnetic recording media according to the invention; 405, 406, 407, 408, 409, 410, 411, and 412 indicate magnetic heads; 413 a movable head arm; 414 a voice coil motor; 415 a control circuit; 416 a positioning detecting circuit; 417 a head selecting switch; 418 a recording and reproducing circuit; and 419 a controller. An S/N ratio of the apparatus when a signal of 80 kFCI was recorded and reproduced by using the above apparatus was evaluated.

Further, after a shock of 150 G was given to the magnetic memory apparatus for 11 msec, the presence or absence of the occurrence of an error was examined.

The above results are summarized and shown in FIG. 5.

As shown in FIG. 5, as compared with the magnetic recording media of the comparison examples 1 to 4, according to the magnetic recording media of the embodiments 1 to 3, it has been found that the coercive forces are high and the recording and reproducing characteristics are extremely excellent and the shock resistance is also excellent.

Embodiment 5

Subsequently, the magnetic head of the magnetic memory apparatus of the above embodiment 4 using the magnetic recording media of the embodiments 1 to 3 was replaced with a recording and reproduction separating type magnetic head in which a magneto-resistive effect device is included in a reproducing portion and a nonmagnetic material using alumina titanium carbide as a main component is used as a core portion. Recording and reproducing characteristics were evaluated by a method similar to that of the embodiment 4. Thus, an S/N ratio of the apparatus was improved by 1.5 or more time. In combination with the magnetic recording media of the embodiments 1 to 3 and the recording and reproduction separating type magnetic head including the magneto-resistive effect device as a reproducing portion, since an S/N ratio of the medium is large, a floating amount of the magnetic head can be increased or the like, so that a magnetic memory apparatus of a high reliability can be provided. A mean life of the apparatus until the occurrence of an error was obtained. Thus, as compared with the apparatus using the conventional recording medium, the life is two or ten times as long as that of the conventional one and a high reliability was obtained. It is desirable to form a layer of C, Si, $SiO_2$, $ZrO_2$, $Al_2O_3$, etc. onto the surface of the magneto-resistive effect device because the reliability of the apparatus can be further improved.

For example, Cr, Mo, W, Cr—Ti, Cr—V, Cr—Si, Cr—W, C, Ni—P, or the like is used as a material of the underlayers 12 and 12'. For example, Co—Ni, Co—Ni—Cr, Co—Ni—Zr, Co—Ni—Pt, Co—Cr, Co—Cr—Ta, Co—Cr—Pt, Co—Cr—Pt—Si, Co—Cr—Ta—Pt, or the like is used as a material of the magnetic layers 13, 13', 32, and 32'. A coefficient of linear expansion of each of those magnetic layers is equal to about 0.000012/deg. On the other hand, C, carbide, nitride, oxide, silicide, or the like can be used as a material of the protective coating layers 14, 14', 33, and 33'. A similar effect is obtained by any combination of those materials. No problem will occur even if the underlayers, magnetic layers, and protective coating layers are constructed by two or more layers. It is also possible to form a precoating layer for the non-magnetic substrate and, after that, to provide the underlayers, magnetic layers, and protective coating layers.

What is claimed is:

1. A magnetic recording medium comprising:

a rigid substrate made of a nonmetal, nonmagnetic material having a coefficient of linear expansion at room temperature within a range from 0.000013/deg to 0.0001/deg; and a magnetic layer having a negative magnetostrictive constant which is formed on said rigid substrate as a thin film and is selected from a thin polycrystalline film and a thin amorphous film;

said magnetic layer having a coefficient of linear expansion at room temperature of 0.000012/deg or less.

2. A magnetic recording medium comprising:

a rigid substrate made of a nonmetal, nonmagnetic material; and a magnetic layer having a negative magnetostrictive constant which is formed on said rigid substrate as a thin film and is selected from a thin polycrystalline film and a thin amorphous film, wherein the coefficient of linear expansion at room temperature of said nonmetal, nonmagnetic material is larger than the coefficient of linear expansion at room temperature of said magnetic layer.

3. A magnetic recording medium comprising:

a rigid substrate made of a nonmetal, nonmagnetic material having a coefficient of linear expansion at room temperature within a range from 0.000013/deg to 0.0001/deg; and a magnetic layer having a negative magnetostrictive constant which is formed on said rigid substrate as a thin film and is selected from a thin polycrystalline film and a thin amorphous film, wherein the coefficient of linear expansion at room temperature of said nonmetal, nonmagnetic material is larger than the coefficient of linear expansion at room temperature of said magnetic layer.

* * * * *